United States Patent
Speggiorin et al.

(10) Patent No.: US 9,383,632 B2
(45) Date of Patent: Jul. 5, 2016

(54) STAND FOR VIDEO-PHOTOGRAPHIC APPARATUS

(71) Applicant: LINO MANFROTTO + CO. S.p.A., Cassola (PD) (IT)

(72) Inventors: Paolo Speggiorin, Mussolente (IT); Andrea Mendo, Rossano Veneto (IT)

(73) Assignee: LINO MANFROTTO+Co S.P.A, Cassola (PD) (IT)

( * ) Notice: Subject to any disclaimer, the term of this patent is extended or adjusted under 35 U.S.C. 154(b) by 0 days.

(21) Appl. No.: 14/431,091

(22) PCT Filed: Sep. 27, 2013

(86) PCT No.: PCT/EP2013/070255
§ 371 (c)(1),
(2) Date: Mar. 25, 2015

(87) PCT Pub. No.: WO2014/056739
PCT Pub. Date: Apr. 17, 2014

(65) Prior Publication Data
US 2015/0241762 A1    Aug. 27, 2015

(30) Foreign Application Priority Data
Oct. 8, 2012 (IT) .............. PD2012A0292

(51) Int. Cl.
| | |
|---|---|
| *F16M 13/00* | (2006.01) |
| *G03B 17/56* | (2006.01) |
| *F16M 11/32* | (2006.01) |
| *F16M 11/24* | (2006.01) |
| *F16M 11/04* | (2006.01) |
| *F16M 11/06* | (2006.01) |

(52) U.S. Cl.
CPC ............. *G03B 17/568* (2013.01); *F16M 11/04* (2013.01); *F16M 11/06* (2013.01); *F16M 11/242* (2013.01); *F16M 11/32* (2013.01); *F16M 13/00* (2013.01)

(58) Field of Classification Search
CPC ..... F16M 11/02; F16M 11/04; F16M 11/105; F16M 11/08; F16M 11/16; F16M 11/32; F16M 11/041; F16M 11/043; F16M 11/2064; F16M 11/06; F16M 11/242

USPC .......... 248/187.1, 181.1, 177.1, 178.1, 180.1, 248/168, 163.1, 188.8, 309.1, 542; 396/419, 428

See application file for complete search history.

(56) References Cited

U.S. PATENT DOCUMENTS

| | | | |
|---|---|---|---|
| 1,894,456 A | 1/1933 | Zerk | |
| 6,991,384 B1 * | 1/2006 | Davis | F16M 11/02 248/187.1 |
| 7,988,108 B2 * | 8/2011 | Zen | F16M 11/32 248/157 |
| 2011/0260016 A1 * | 10/2011 | Johnson | F16M 11/16 248/168 |

FOREIGN PATENT DOCUMENTS

| | | |
|---|---|---|
| CN | 201547463 U | 8/2010 |
| WO | 03/083351 A1 | 10/2003 |

OTHER PUBLICATIONS

ISR and Written Opinion in PCT/EP2013/070255 dated Oct. 25, 2013.

* cited by examiner

*Primary Examiner* — Todd M Epps
(74) *Attorney, Agent, or Firm* — Kristina Castellano; Castellano PLLC (57) ABSTRACT

A stand (20) for video-photographic apparatuses comprises a support member (2), a support plate (3) which is fixed to the member (2) and which is intended to receive a video-photographic apparatus and which is provided with hooking means (4) for hooking the video-photographic apparatus to the support plate (3), a level indicator (5) which is suitable for indicating the positioning of the apparatus with respect to a horizontal plane and which is provided with fixing means (6) which are arranged for cooperating with corresponding fixing counter-means (7), the fixing counter-means (7) provided on the plate (3) in order to fix the level indicator (5) to the plate (3), wherein the fixing means (6) and the fixing counter-means (7) are configured in such a manner that the level indicator (5) can be fixed in at least two different positions on the plate (3), the positions being suitably spaced apart from each other.

13 Claims, 6 Drawing Sheets

STAND FOR VIDEO-PHOTOGRAPHIC APPARATUS

CROSS REFERENCE TO RELATED APPLICATIONS

This application is a U.S. National Stage Application of PCT/EP2013/070255 filed on Sep. 27, 2013, which claims priority to Italian Patent Application No. PD2012A000292 filed on Oct. 8, 2012, the contents of both of which are incorporated herein by reference.

TECHNICAL FIELD

The present invention relates to a support device for video-photographic apparatuses, generally referred to as a stand, having the features set out in the preamble of the main claim.

The stand may be a tripod or monopod or, in general, a support for video-photographic apparatuses to be used during the use thereof.

TECHNOLOGICAL BACKGROUND

Video-photographic apparatuses are often mounted on suitable supports, generally known as stands, which are intended to support those apparatuses in a stable and secure manner during the recording operations. The stands can then be supported on the ground or another desired support surface in order to carry out the recordings.

During use of the video-photographic apparatuses, there is often a need for the operator to verify whether the apparatus being used is arranged in a horizontal plane or is inclined with respect to the horizontal plane.

Therefore, the heads of the video-photographic apparatuses and/or the video-photographic apparatuses themselves are sometimes provided with a spirit level or other device for indicating the level, for example, a digital level, suitable for indicating the incline of the apparatus with respect to a horizontal reference plane, or in order to indicate whether the apparatus is arranged in a horizontal manner.

However, in some apparatuses having small dimensions, for example, so-called compact apparatuses, it may be difficult to find a suitable receiving member for the level indicator on the apparatus itself.

Furthermore, in some situations, when the level indicator is provided on the head, the use of the indicator itself may be difficult, for example, because the video-photographic apparatus or the accessories thereof can be positioned in the region of the level or in such positions as to impede a user from correctly reading the level itself.

This disadvantage may occur, for example, as a result of movements of the apparatus and/or the head during the positioning thereof.

In such cases, the correct positioning of the video-photographic apparatus is compromised, reducing the quality of the recordings made.

Furthermore, in such solutions, in order to have an indication regarding the horizontal nature of the video-photographic apparatus, it is absolutely necessary to use the head provided with the level indicating device.

The same problem involving difficulty of reading the indicator or covering the indicator during use also occurs when the level indicator is fixed to the stand because, by the head being moved and/or the apparatus being moved for positioning it in a desired manner, and/or the recordings being made, it is possible to cover the level, preventing correct and/or easy reading thereof by the user.

Furthermore, changing the type of head naturally changes the form thereof and therefore a specific head may cover the level or make it difficult for the user to read.

STATEMENT OF INVENTION

An object of the invention is to provide stands which allow the correct positioning of the video-photographic apparatuses, allowing simple and convenient use of a level or other level indicating device.

The problem addressed by the present invention is to provide a stand for video-photographic apparatuses which overcomes the drawbacks set out above with reference to the cited prior art.

In the context of this problem, an object of the invention is to develop a stand which is simple to produce and of low cost and which, at the same time, allows a high level of precision of positioning of the video-photographic apparatus associated therewith.

Another object is to provide a stand in which the level indicator is positioned as near as possible the video-photographic apparatus but which is at the same time visible in every situation of use of the apparatus itself.

This problem is solved and this object is achieved by the present invention by means of a stand constructed in accordance with the appended claims.

BRIEF DESCRIPTION OF THE DRAWINGS

The features and advantages of the present invention will be better appreciated from the detailed description of a preferred embodiment thereof, illustrated by way of non-limiting example with reference to the appended drawings, in which.

PREFERRED EMBODIMENT OF THE INVENTION

The appended Figures show a stand 20 for a video-photographic apparatus, which is not illustrated in the appended Figures, which stand is constructed according to the present invention.

In the version shown, the stand is a tripod, but in other versions of the invention, stands having different forms, for example, a monopod, may be provided.

The term "stand" is intended to be understood in the context of the present patent description to be a generic structure for supporting video-photographic apparatuses which is suitable for supporting such apparatuses during use thereof.

Figure 1:
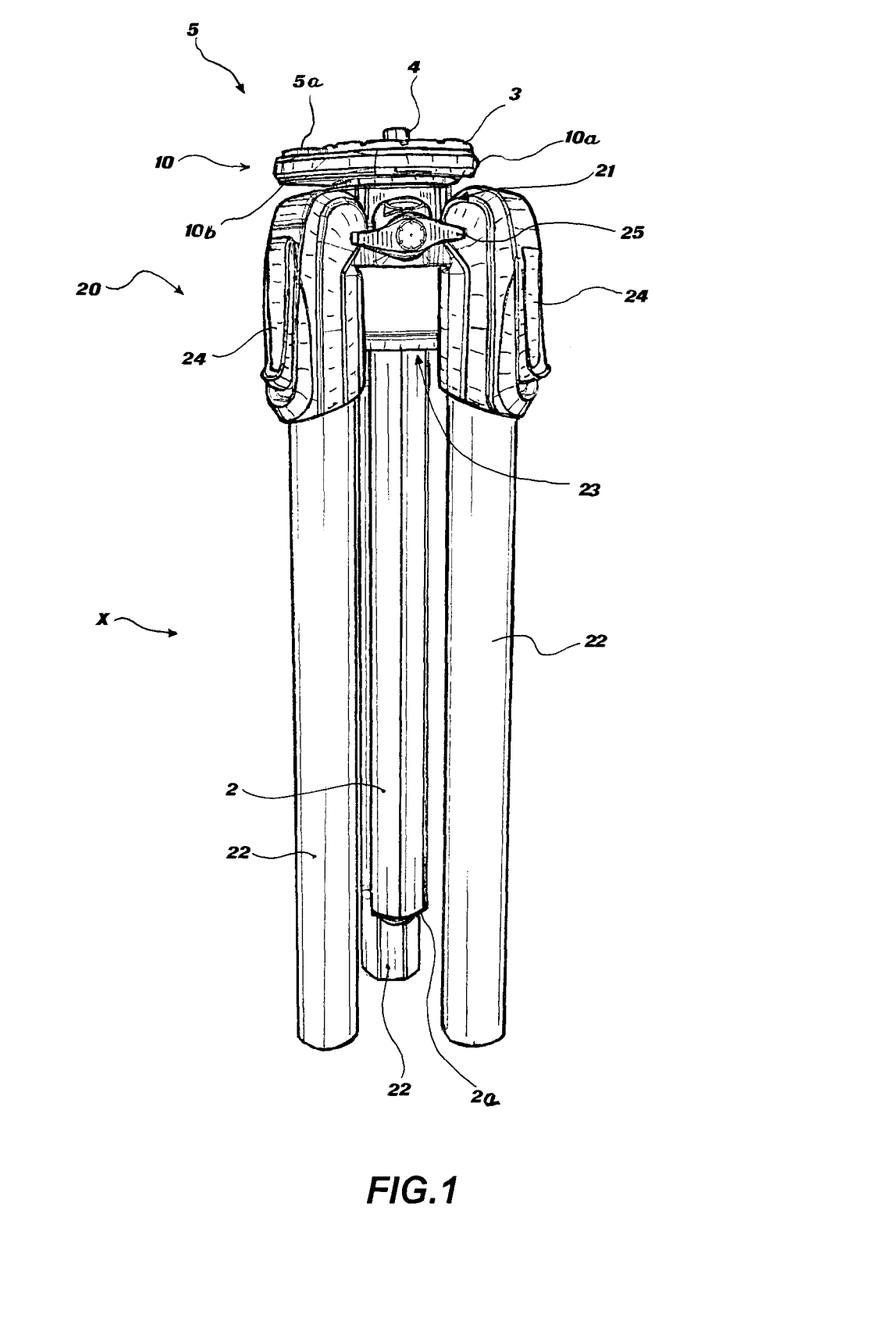
FIG. 1 is a schematic view of a stand for video-photographic apparatuses according to the invention.
Figure 2:
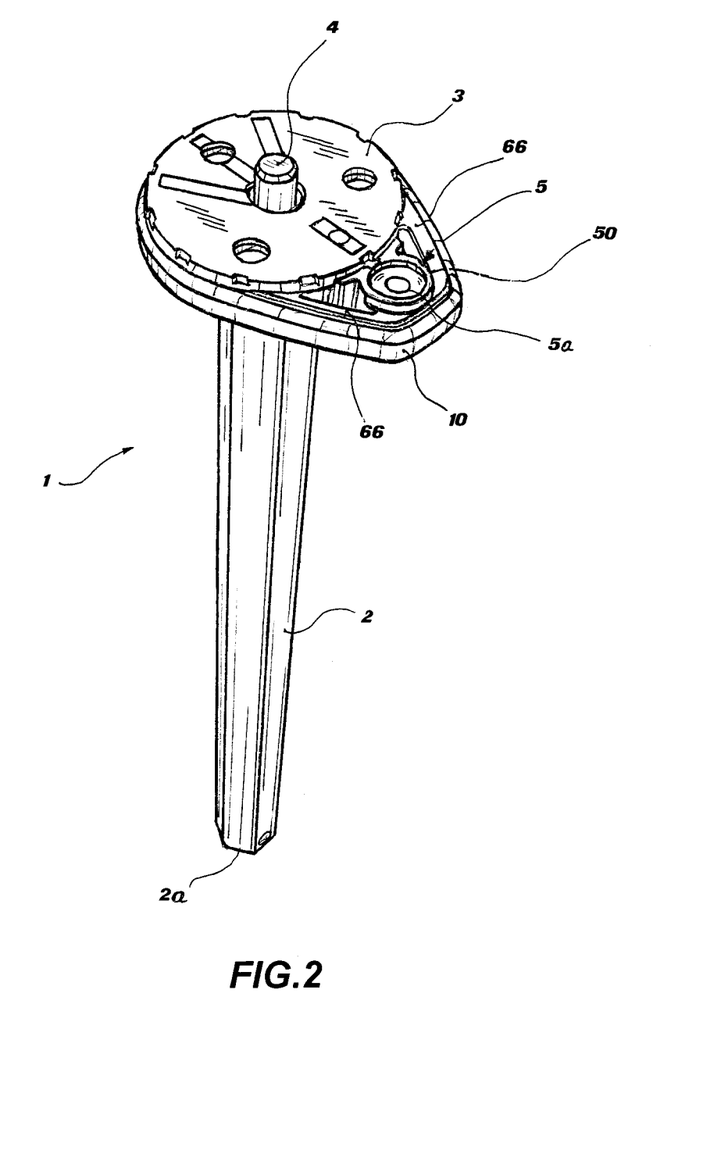
FIG. 2 is a schematic perspective view of a portion of the stand of FIG. 1.

The stand 20 comprises a spider connection element 21, to which there are rotatably fixed three support legs 22 which are movable between a plurality of opening positions which are not shown in the Figures, in order to allow stable support of the stand 20 on the ground, or on a desired support surface, and a closed position X which is shown in FIG. 1, in which the support legs 22 are arranged parallel with each other.

The support legs 22 may be telescopic in order to be able to vary the length thereof and, furthermore, each support leg 22 is provided with a respective locking element 24 which is able to lock each support leg 22 in a predetermined position with respect to the spider connection element 21.

The spider connection element 21 comprises a receiving cavity which is capable of receiving in a sliding manner a tubular support member 2, as better explained below, and a locking device 25 which is capable of being activated to allow/prevent the sliding of the support member 2 with respect to the spider connection element 21.

The support member 2, which can be better seen in FIGS. 2 to 6, is of tubular form and is formed so as to be slidably inserted in the receiving cavity of the stand 20 in order to adjust the position thereof.

The support member 2 is provided with coupling means which allow the support member 2, which is provided with the plate 3 and the level indicator 5, to be coupled to a stand.

The support member 2 comprises a free end 2a which is arranged so as to be directed during use towards the ground, or towards the support portion of the support legs 22 on the ground (or any desired support surface) and an opposite end which is not visible in the Figures and to which there is fixed a plate 3 which is intended to support, during use, a video-photographic apparatus.

The plate 3 is provided with hooking means 4 for hooking the video-photographic apparatus to the plate 3 itself in a stable manner.

The plate 3, in the version shown, is of circular shape but there may be constructed devices in which the plate has a shape which is not completely circular, for example, a support plate having a perimeter formed by a plurality of curvilinear, ovoid or polygonal portions.

There is further provided on the support member 2 of the stand 20 a level indicator 5 which is capable of indicating the positioning of the video-photographic apparatus with respect to the horizontal plane.

The level indicator 5, which can better be seen in FIGS. 3 to 6, shows the user of the stand 20 whether the video-photographic apparatus hooked to the plate 3 is positioned parallel with the horizontal plane or whether the apparatus is instead inclined with respect to the horizontal plane.

The level indicator 5 comprises a housing body 50 for a level 5a and fixing means 6 which are arranged to cooperate with fixing counter-means 7 which are provided on the plate 3 to fix the level indicator 5 to the plate 3 in a stable manner.

In the version shown, the level indicator 5 uses a spirit level as the indicator element but, in other versions which are not illustrated, there may be provided other suitable indicator elements such as, for example, digital level displays, which indicate the position of the plate 3 with respect to a horizontal plane.

The fixing means 6 and the fixing counter-means 7 are formed so as to allow the user to position the level indicator 5 on the plate 3 in a stable manner and in at least two different positions which are mutually spaced apart.

In that manner, as will be explained in greater detail below, it is possible to position the level indicator 5 in the desired position, in order to prevent the level indicator 5 from being partially covered, or the visibility thereof from being impaired, for example, by the head used and/or the apparatus fixed to the support device 1 of the invention, or in order to prevent the level indicator 5 from interfering with the video-photographic apparatus.

Furthermore, in the stand 20 of the invention, the level indicator 5 is fixed to the plate 3 in a stable manner and is positioned very close to the video-photographic apparatus, so as to indicate the horizontal state thereof.

Therefore, the precision of indication is very high.

At the same time, the form of the fixing means 6 and the fixing counter-means 7 allows the level indicator 5 to be visible and readily legible in every situation of use of the video-photographic apparatus itself.

The fixing counter-means 7 are provided on a perimetral portion 3a of the plate 3 in such a manner that the level indicator 5 can be positioned in at least two different positions which are defined on the perimetral portion 3a of the plate 3. The fixing counter-means 7 extend along at least one section "d" of the perimetral portion 3a of the plate 3 in such a manner that the level indicator 5 can be moved along the fixing counter-means 7 in order to be positioned in a desired position on the perimetral portion 3a.

In the version shown, with the plate being in circular form, the fixing counter-means 7 extend over at least an arc having a circumference corresponding to an angle of approximately 45°.

The level indicator 5 can be moved along the fixing counter-means 7 along the section "d" of the perimetral portion 3a on which there are provided the fixing counter-means 7 in order to be moved between the at least two different positions.

Optionally, the fixing counter-means 7 may comprise a plurality of separate fixing elements which are defined on the perimetral portion 3a of the plate 3, each fixing element being suitably spaced apart from an adjacent fixing element. In that manner, the level indicator 5 may be fixed to a desired fixing element by selecting the fixing element provided in a suitable zone of the plate, so as to prevent any impediments from being able to impair the reading of the level indicator 5.

Optionally, each fixing element of the plurality of fixing elements may extend over a respective section of the perimetral portion 3a of the plate 3. In that manner, the level indicator 5 may further be moved along each fixing element in order to be positioned in the desired position on the perimetral portion 3a of the plate 3. This allows the positioning versatility of the level indicator 5 on the plate 3 to be increased.

The fixing means 6 and the fixing counter-means 7 are formed so as to mutually coupling in a shape coupling in order to allow stable fixing of the level indicator 5 to the plate 3.

In the version shown, the fixing counter-means 7 comprise a groove 8 which extends along the entire perimetral portion 3a of the plate 3, the fixing means 6 being formed so as to become inserted in a shape coupling in the groove 8 in order to fix the level indicator 5 in a stable manner in any desired position on the plate 3.

By providing a groove 8 along the entire outer perimeter 3a of the plate 3, it is possible to fix the level indicator 5 in any desired position on the plate 3 and to move it, if desired, along the entire outer perimeter 3a of the plate 3. This allows the visibility of the level indicator 5 to be further increased and reading thereof by a user to be further eased.

Therefore, the versatility of the stand 20 obtained is increased.

In other versions which are not shown, the fixing counter-means 7 comprise a plurality of grooved elements, each grooved element of the plurality of grooved elements extends over a suitable section of the perimetral portion 3a of the plate 3, and two adjacent grooved elements are mutually spaced apart by a suitable portion.

In that case, the fixing means 6 are formed so as to be inserted with shape coupling in each grooved element in order to fix the level indicator 5 in a stable manner in any desired position on the plate 3. Furthermore, the level indicator 5 can be moved along each grooved element. In that case, the user, in accordance with the form of the head or the video-photographic apparatus being used, positions the level indicator 5 on a desired grooved element and, if necessary, moves the level indicator 5 along the grooved element preselected to position the level 5a wherever desired, in such a manner that the level indicator 5 is readily legible by a user.

The provision of a groove 8 or a plurality of grooved elements is particularly suitable when a plate 3 of the stand 20 is of circular form or oval form or has an outer perimeter which is substantially curved so as to allow movement on all the perimetral portion 3a, or on portions of the perimetral portion 3a, of the level indicator 5.

Figure 3:
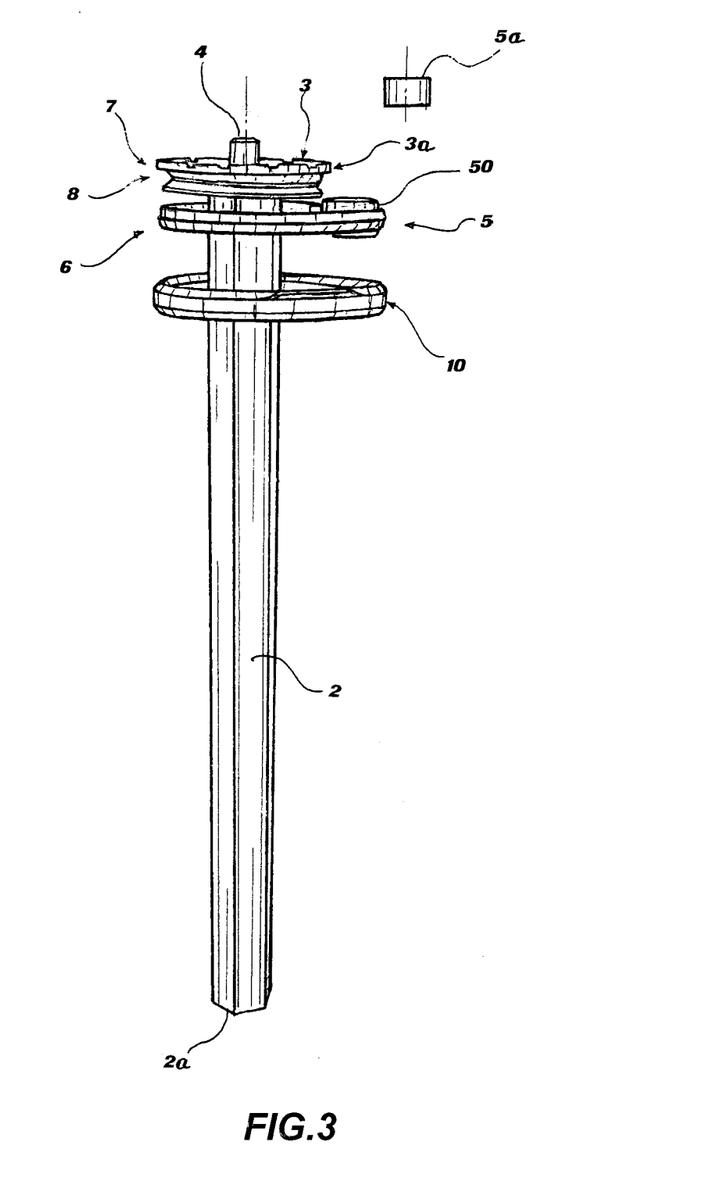
FIGS. 3 to 5 are exploded schematic views of a portion of the stand of FIG. 2.
Figure 4:
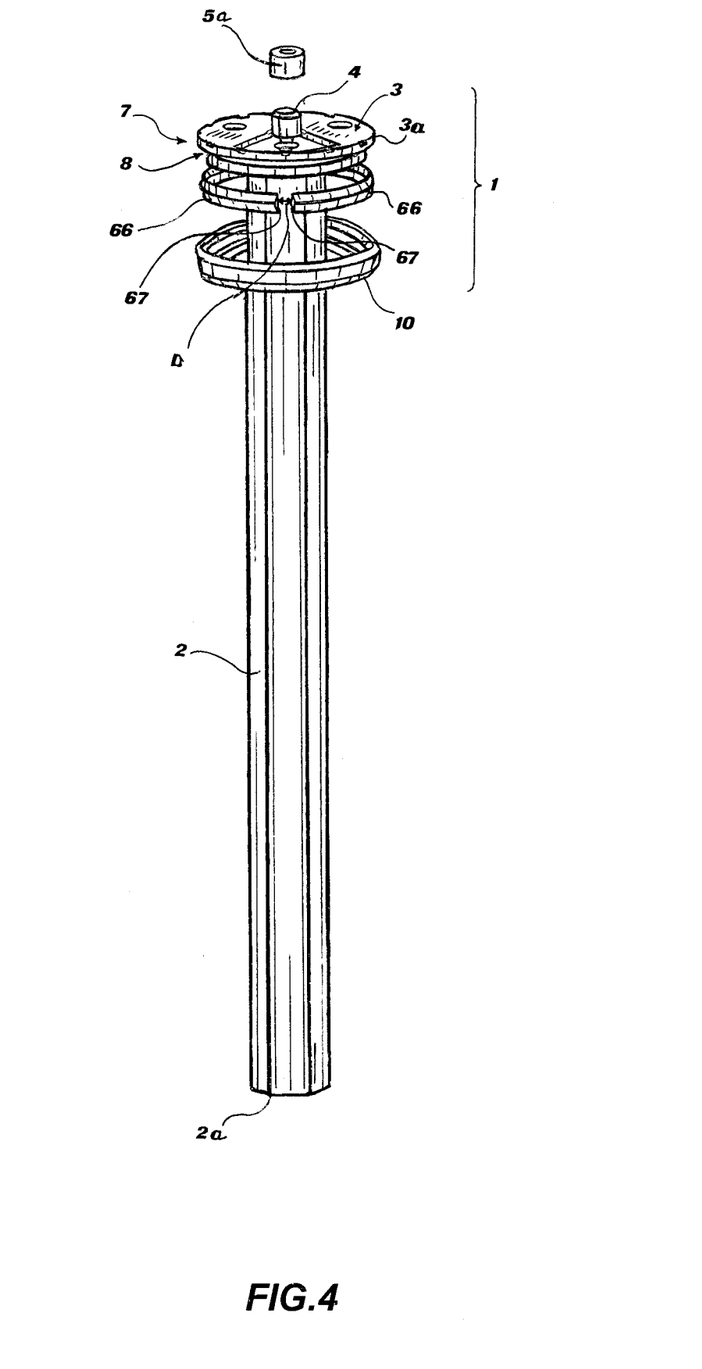
Figure 5:
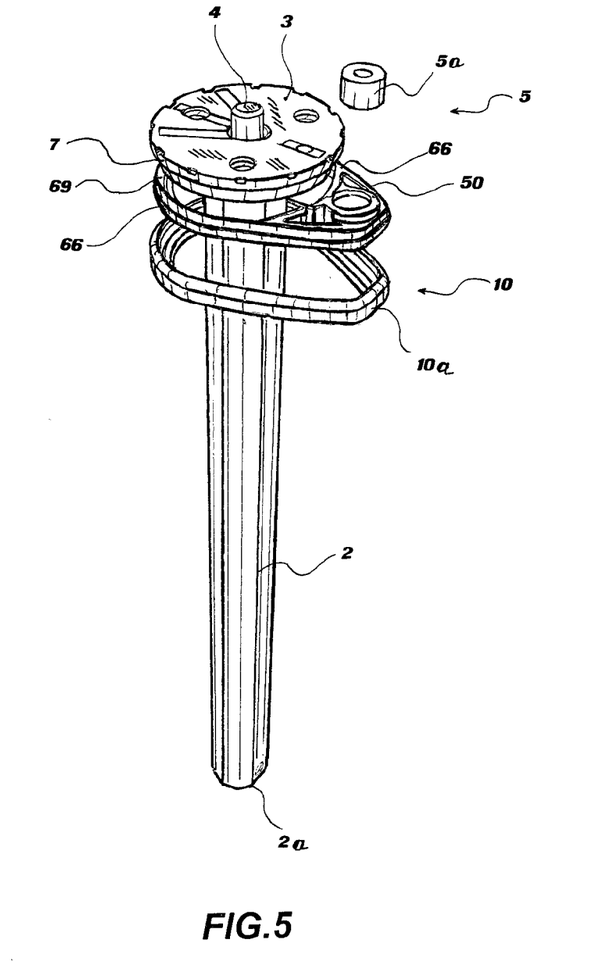
Figure 6:
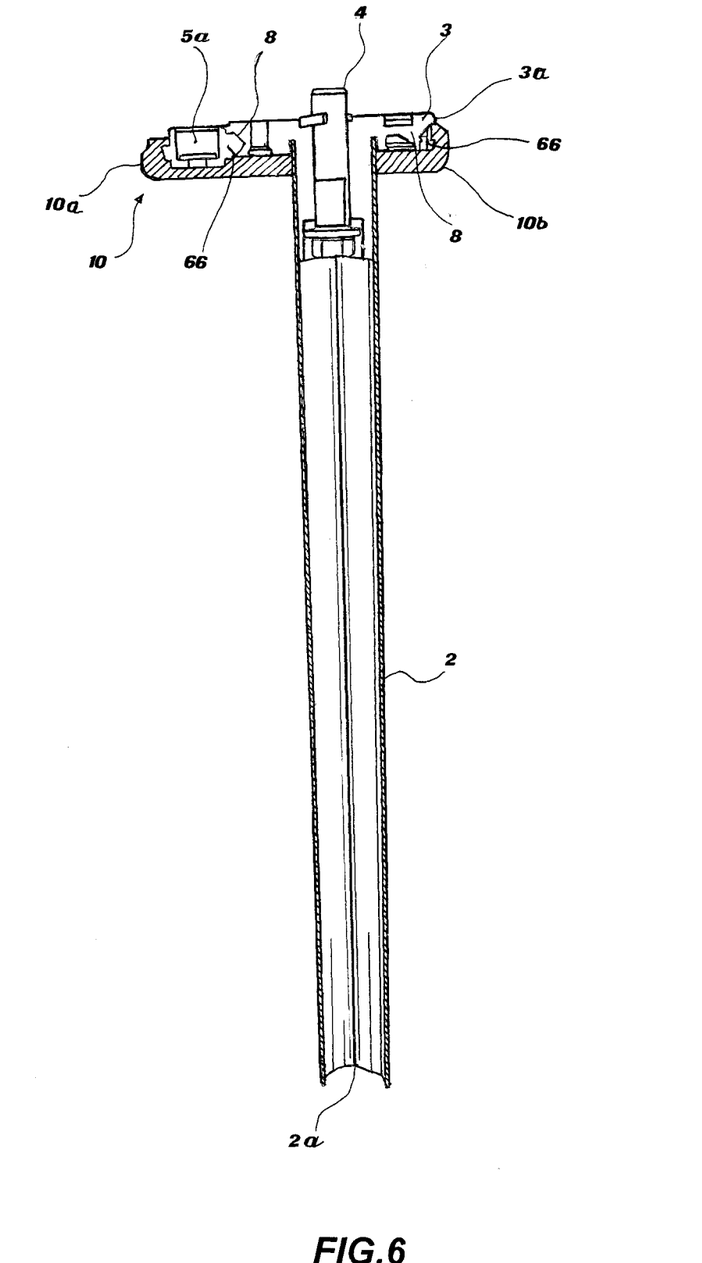
FIG. 6 is a cross-section of a portion of the stand of FIG. 2.

In the version shown, the groove 8 has a profile which can better be seen in FIGS. 3 and 6 and which is in the form of a "V".

The "V"-like profile of the groove 8 allows correct positioning of the level indicator 5 on the plate 3; in fact, the "V"-like profile of the groove 8 acts as a centering element for the level indicator 5.

This allows correct positioning of the level indicator 5 by preventing undesirable inclinations thereof with respect to the horizontal plane.

In other versions of the stand 20 which are not shown in the Figures, there may be provided centering elements of various forms which are selected in a manner suitable for the type of fixing means 6 and fixing counter-means 7 which are provided on the stand 20, the centering elements being suitable for allowing correct positioning of the level indicator 5 on the plate 3.

In the version shown, the fixing means 6 of the level indicator 5 comprise a pair of fixing arms 66 which extend at opposite sides from the member 50 and which are formed so as to extend, during use, over a substantial region of the perimetral portion 3a of the plate 3.

In the version shown, the arms 66 are formed in such a manner that opposite free ends 67 of the two arms 66 are spaced apart, during use, by a distance "D" which is preferably between 1 and 20 mm.

Figure 7:
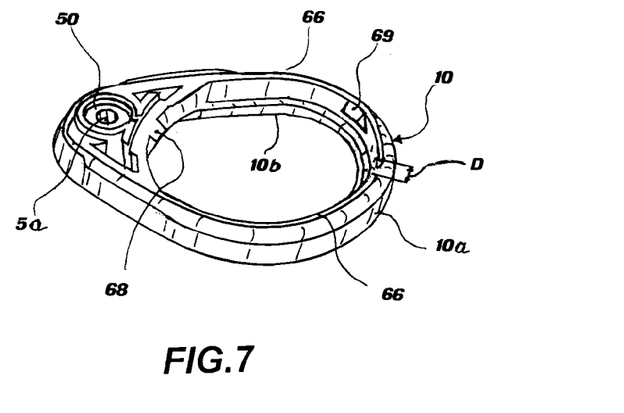
FIG. 7 is a perspective view of details of the stand of FIG. 1.

In the version shown, each arm 66 has at least one hooking portion 69 which can better be seen in FIG. 7, having a profile corresponding to the "V"-like profile of the groove 8 so as to be received with form-fitting coupling in the groove 8.

An additional hooking portion 68 is provided in the region of the receiving member 50, the additional hooking portion 68 is formed so as to become coupled with form-fitting coupling with the groove 8 and allows the stability and precision of positioning of the level indicating device 5 on the plate 3 to be further increased.

In other versions which are not shown, each arm 66 has a profile corresponding to the "V"-like profile of the groove 8, extending over the entire length of each arm 66 or a substantial portion thereof, in such a manner that the arms 66 can be received with form-fitting coupling in the groove 8 in order to allow stable positioning of the level indicator 5 and centering thereof.

The profile of the arms 66 or the profile of the hooking portions 69 and/or the additional hooking portion 68 acts in this case as a fixing means in order to fix the level indicator 5 to the plate 3 and, together with the "V"-like profile of the groove, as a centering element for the level indicator 5 on the plate 3.

In other versions which are not shown, there may be provided various fixing means for fixing the level indicating device 5 to the plate 3, for example, clip type formations, etc., the fixing counter-means 7 of the plate 3 being selected in a manner corresponding to the fixing means 6 being used, in such a manner that the level indicator can be positioned in at least two different positions on the plate 3 which are suitably spaced apart from each other.

The stand 20 further comprises a retaining member 10 which is in the form of a resilient strip and which is arranged to be positioned externally with respect to the level indicator 5, or in such a manner that the level indicator 5 is interposed, during use, between the perimetral portion 3a of the plate 3 and the retaining member 10.

The retaining member 10 which can better be seen in FIGS. 6 and 7 allows the level indicator 5 to be retained in a stable manner in the preselected position on the plate 3, preventing movements with respect to the vertical, or the level indicator 5 from leaving the groove 8, or in general preventing decoupling from taking place between the fixing means 6 and the fixing counter-means 7.

The retaining member 10 is produced from resilient material, preferably an elastomer material and can therefore be slightly deformed.

Therefore, the retaining member 10 allows movement of the level indicator 5 by making it slide along the groove 8 in such a manner as to position the level 5a in the desired position on the plate 3 without having to remove the level indicator 5 from the plate 3 itself.

The retaining member 10 comprises a lateral portion 10a which is intended to be positioned externally with respect to the arms 66 of the level indicator 5, and a lower portion 10b which is capable of being positioned during use below the arms 66 or capable of being interposed between the arms 66 and the spider element 21, or another joint element of the stand 20.

In that manner, the lower portion 10b of the retaining member 10 protects the level indicator 5 from any accidental impacts.

When the stand 20 is closed, the lower portion 10b moves into abutment against the spider element 21, preventing the level indicator 5 from striking the spider element 21, or any other joint type element of the stand. The lower portion 10b of the retaining member 10 protects the level indicator 5 from any blows or impacts which could damage it.

Furthermore, since the retaining member 10 is produced from resilient material, any blows are absorbed by the resilient material itself, preventing repercussions on the level indicator 5.

In other versions which are not shown, the support member 2 may be provided with different coupling means which are capable of allowing the support member 2 which is provided with the plate 3 and the level indicator 5 to be coupled to different stands so that the same level indicator 5 can be used with difference stands in accordance with the requirements of the user. In that manner, the user is provided with a support member 20 provided with the level indicator 5 and couples it from time to time to a specific stand. In that manner, the user can make precise recordings with various stands, substantially limiting the overall expenditure.

The invention claimed is:

1. A stand for video-photographic apparatuses comprising a support member, a support plate which is fixed to said member and which is intended to receive a video-photographic apparatus and which is provided with hooking mechanism for hooking the video-photographic apparatus to the support plate, a level indicator which is suitable for indicating a positioning of the apparatus with respect to a horizontal plane and which is provided with fixing mechanism which are arranged for cooperating with corresponding fixing counter-mechanism, said fixing counter-mechanism being provided on said plate in order to fix said level indicator to said plate, said fixing mechanism and said fixing counter-mechanism being configured in such a manner that said level indicator can be fixed in at least two different positions on said plate, the positions being suitably spaced apart from each other, wherein said fixing counter-mechanism are defined on a perimetral portion of said plate.

2. The stand according to claim 1, wherein said fixing counter-mechanism extends along a portion of said perimetral portion in such a manner that said level indicator can be moved along said portion of said perimetral portion between said at least two different positions.

3. The stand according to claim 1, wherein said fixing counter-mechanism extend along an entire perimeter of said plate.

4. The stand according to claim 1, wherein said fixing counter-mechanism comprise a groove which is defined along at least one portion of said perimetral portion of said plate, said fixing mechanism being configured so as to become coupled in a shape coupling manner to said groove so as to allow said level indicator to slide along said groove.

5. The stand according to claim 4, further comprising a centering device for correctly positioning said level indicator on said plate, a profile of said groove being of a "V"-like shape so as to act as a centering device for said level indicator.

6. The stand according to claim 5, wherein the level indicator comprises a housing member which is capable of receiving in a stable manner a level-indicating device and a pair of fixing arms which extend at opposite sides with respect to said member and which are configured so as to extend over a substantial portion of a perimetral portion of said plate in order to fix said level indicator to said plate.

7. The stand according to claim 6, wherein said level indicator is provided with at least one hooking portion having a profile corresponding to the "V"-like shape of the profile of said groove in such a manner that said at least one hooking portion can be received in shape coupling in said groove in order to allow stable positioning of said level indicator on said plate.

8. The stand according to claim 1, further comprising a retaining member arranged for retaining said level indicator on said plate.

9. The stand according to claim 8, wherein said retaining member is in the form of a resilient strip and is configured so as to be positioned externally with respect to said level indicator, in such a manner that said level indicator is interposed, during use, between said plate and said retaining member.

10. The stand according to claim 8, wherein said retaining member is constructed from a resilient deformable material produced from elastomer material.

11. The stand according to claim 8, wherein said retaining member comprises a lateral portion which is intended to be positioned externally with respect to said level indicator and a lower portion which is capable of being interposed, during use, between said level indicator and a sliding receiving cavity of said support member in said stand.

12. The stand according to claim 7, wherein a retaining member comprises a lateral portion which is intended to be positioned externally with respect to said level indicator and a lower portion which is capable of being interposed, during use, between said level indicator and a sliding receiving cavity of said support member in said stand.

13. A support member for video-photographic apparatuses comprising a support member, a support plate which is fixed to said member and which is intended to receive a video-photographic apparatus and which is provided with hooking mechanism for hooking the video-photographic apparatus to said support plate, coupler for coupling said support member to a stand for video-photographic apparatus, a level indicator which is suitable for indicating a positioning of said apparatus with respect to a horizontal plane, said level indicator being provided with mechanism which are arranged for cooperating with corresponding fixing counter-mechanism, said fixing counter-mechanism being provided on said plate in order to fix said level indicator to said plate, said fixing mechanism and said fixing counter-mechanism being configured in such a manner that said level indicator can be fixed in at least two different positions on said plate, the positions being suitably spaced apart from each other wherein said fixing counter-mechanism is defined on a perimetral portion of said plate.

\* \* \* \* \*